(12) United States Patent
Bousmalis et al.

(10) Patent No.: US 10,991,074 B2
(45) Date of Patent: Apr. 27, 2021

(54) TRANSFORMING SOURCE DOMAIN IMAGES INTO TARGET DOMAIN IMAGES

(71) Applicant: Google LLC, Mountain View, CA (US)

(72) Inventors: Konstantinos Bousmalis, London (GB); Nathan Silberman, Brooklyn, NY (US); David Martin Dohan, San Francisco, CA (US); Dumitru Erhan, San Francisco, CA (US); Dilip Krishnan, Arlington, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/442,365

(22) Filed: Jun. 14, 2019

(65) Prior Publication Data

US 2019/0304065 A1 Oct. 3, 2019

Related U.S. Application Data

(63) Continuation of application No. PCT/GR2016/000067, filed on Dec. 15, 2016.

(51) Int. Cl.
*G06T 3/40* (2006.01)
*G06N 20/10* (2019.01)
*G06N 3/08* (2006.01)
*G06K 9/62* (2006.01)
*G06N 3/04* (2006.01)

(52) U.S. Cl.
CPC .......... *G06T 3/4046* (2013.01); *G06K 9/6259* (2013.01); *G06N 3/0454* (2013.01); *G06N 3/08* (2013.01); *G06N 3/088* (2013.01); *G06N 20/10* (2019.01); *G06T 3/4084* (2013.01)

(58) Field of Classification Search
CPC ..... G06T 3/4046; G06T 3/4084; G06N 20/10; G06N 3/08
USPC .......................................................... 382/156
See application file for complete search history.

(56) References Cited

U.S. PATENT DOCUMENTS

| | | | |
|---|---|---|---|
| 2016/0232443 A1* | 8/2016 | Fan | G06N 3/08 |
| 2017/0262735 A1* | 9/2017 | Ros Sanchez | G06K 9/481 |
| 2018/0121767 A1* | 5/2018 | Wang | G06K 9/6256 |
| 2018/0204336 A1* | 7/2018 | Fang | G06T 7/40 |

OTHER PUBLICATIONS

Wang, Xiaolong, and Abhinav Gupta. "Generative image modeling using style and structure adversarial networks."European Conference on Computer Vision. Springer, Cham, 2016. (Year: 2016).*

(Continued)

*Primary Examiner* — Amandeep Saini
(74) *Attorney, Agent, or Firm* — Fish & Richardson P.C.

(57) ABSTRACT

Methods, systems, and apparatus, including computer programs encoded on computer storage media, for processing images using an image processing neural network system. One of the systems includes a domain transformation neural network implemented by one or more computers, wherein the domain transformation neural network is configured to: receive an input image from a source domain; and process a network input comprising the input image from the source domain to generate a transformed image that is a transformation of the input image from the source domain to a target domain that is different from the source domain.

20 Claims, 5 Drawing Sheets

(56) References Cited

OTHER PUBLICATIONS

Isola, Phillip, et al. "Image-to-Image Translation with Conditional Adversarial Networks."arXiv preprint arXiv:1611.07004& nbsp;(2016). (Year: 2016).*
Abadi et al. "Tensorflow: Large-scale machine learning on heterogeneous distributed systems" arXiv:1603.04467, Mar. 2016.
Agakov et al. "The IM algorithm: a variational approach to information maximization" In Advances in Neural Information Processing Systems 16: Proceedings of the 2003 Conference, vol. 16, p. 201. MIT Press, 2004.
Ajakan et al. "Domain-adversarial neural networks" http://arxiv.org/abs/1412.4446, Dec. 2014.
Arbelaez et al. "Contour detection and hierarchical image segmentation" TPAMI, 33(5):898-916, 2011.
Bousmalis et al. " Unsupervised Pixe-Level Domain Adaptation with Generative Adversarial Networks" arXiv:1612.05424v2 [cs.Cv] Aug. 23, 2017.
Bousmalis et al. "Domain separation networks" In Proc. Neural Information Processing Systems (NIPS), 2016.
Caseiro et al. "Beyond the shortest path: Unsupervised Domain Adaptation by Sampling Subspaces Along the Spline Flow" . In CVPR, 2015
Chen et al. "Infogan: Interpretable representation learning by information maximizing generative adversarial nets" arXiv:1606.03657, Jun. 2016.
Christiano et al. "Transfer from simulation to real world through learning deep inverse dynamics model" arXiv:1610.03518, 2016.
Deng et al. "ImageNet: A Large-Scale Hierarchical Image Database" In CVPR09, 2009.
Denker et al. "Neural network recognizer for hand-written zip code digits" In NIPS, pp. 323-331, 1988.
Eigen et al. "Depth map prediction from a single image using a multi-scale deep network" In NIPS, pp. 2366-2374, 2014.
Everingham et al. "The pascal visual object classes challenge: A retrospective" International Journal of Computer Vision, 111(1):98-136, 2015.
Ganin et al. "Domain-Adversarial Training of Neural Networks" JMLR, 17(59):1-35, Apr. 2016.
Ganin et al. "Unsupervised domain adaptation by backpropagation" arXiv:1409.7495, 2014.
Gatys et al. "A neural algorithm of artistic style" arXiv:1508.06576, 2015.
Gatys et al. "Image style transfer using convolutional neural networks" In Proceedings of the IEEE Conference on Computer Vision and Pattern Recognition, pp. 2414-2423, 2016.
Gong et al. " Geodesic flow kernel for unsupervised domain adaptation" In CVPR, pp. 2066-2073. IEEE, 2012.
Goodfellow et al. "Generative adversarial nets" In Advances in Neural Information Processing Systems, pp. 2672-2680, 2014.
Gopalan et al. "Domain Adaptation for Object Recognition: An Unsupervised Approach" In ICCV, 2011.
Gretton et al. "A Kernel Two-Sample Test" JMLR, pp. 723-773, 2012.
He et al. "Deep residual learning for image recognition" In Computer Vision and Pattern Recognition (CVPR), 2016 IEEE Conference on, 2016.
Hinterstoisser et al. "Model based training, detection and pose estimation of texture-less 3d objects in heavily cluttered scenes" In ACCV, 2012.
Huynh Metrics for 3d rotations: Comparison and analysis. Journal of Mathematical Imaging and Vision, 35(2):155-164, 2009.
Johnson et al. "Perceptual losses for real-time style transfer and super-resolution" arXiv:1603.08155, 2016.
Johnson-Roberson et al. "Driving in the matrix: Can virtual worlds replace human-generated annotations for real world tasks?" arXiv:1610.01983, Oct. 2016.
Kingma et al. "Adam: A method for stochastic optimization" arXiv:1412.6980, 2014.
LeCun et al. "Gradientbased learning applied to document recognition" Proceedings of the IEEE, 86(11):2278-2324, 1998.
Ledig et al. "Photo-realistic single image super-resolution using a generative adversarial network" arXiv:1609.04802, 2016.
Lin et al. "Microsoft coco: Common objects in context" In European Conference on Computer Vision, pp. 740-755. Springer, 2014.
Liu et al. "Coupled generative adversarial networks" arXiv:1606.07536, 2016.
Long et al. "Learning transferable features with deep adaptation networks" ICML, 2015.
Mahendran et al. "Researchdoom and cocodoom: Learning computer vision with games" arXiv:1610.02431, Oct. 2016.
Odena et al. "Conditional Image Synthesis With Auxiliary Classifier GANs" ArXiv e-prints, Oct. 2016.
Odena et al. "Deconvolution and checkerboard artifacts" http://distill.pub/2016/deconycheckerboard/,Oct. 2016.
Qiu et al. "Unrealcv: Connecting computer vision to unreal engine" arXiv:1609.01326, 2016.
Radford et al. "Unsupervised representation learning with deep convolutional generative adversarial networks" CoRR, abs/1511.06434, 2015.
Richter et al. "Playing for data: Ground truth from computer games" In European Conference on Computer Vision, pp. 102-118. Springer, 2016.
Rusu et al. "Sim-to-real robot learning from pixels with progressive nets" arXiv:1610.04286, 2016.
Saenko et al. " Adapting visual category models to new domains" In ECCV. Springer, 2010.
Salimans et al. " Improved techniques for training gans" arXiv:1606.03498, 2016.
Sun et al. "Return of frustratingly easy domain adaptation" In AAAI. 2016.
Szegedy et al. "Rethinking the inception architecture for computer vision" arXiv:1512.00567, Dec. 2016.
Tzeng et al. "Deep domain confusion. Maximizing for domain invariance" arXiv:1412.3474, Dec. 2014.
Tzeng et al. "Simultaneous deep transfer across domains and tasks" In CVPR, pp. 4068-4076, 2015.
Tzeng et al. "Towards adapting deep visuomotor representations from simulated to real environments" arXiv:1511.07111, 2015.
Wang Viaolong et al, "Generative Image Modeling using Style and Structure Adversarial Networks", Sep. 17, 2016, International Conference on Simulation, Modeling, and Programming for Autonomous Robots, Simpar 2010; [Lectyre Notes in Computer Science; Lect.Notes Computer], Springer, Berlin, Heidelberg, pp. 318-335, XP047355398, ISBN; 978-3-642-17318-9 [retrieved on Sep. 17, 2016].
Wohlhart et al. "Learning descriptors for object recognition and 3d pose estimation" In CVPR, pp. 3109-3118, 2015.
Yoo et al. "Pixellevel domain transfer" arXiv:1603.07442, Mar. 2016.
Zhu et al. "Target-driven visual navigation in indoor scenes using deep reinforcement learning" arXiv:1609.05143, Sep. 2016.
PCT International Preliminary Report on Patentability in International Application No. PCT/GR2016/000067, dated Feb. 27, 2019, 13 pages.
PCT International Search Report and Written Opinion in International Application No. PCT/GR2016/000067, dated Aug. 28, 2017, 10 pages.
Taigman et al, "Unsupervised Cross-Domain Image Generation", ICLR 2017, https://arxiv.org/abs/1611.02200, Nov. 2016, 14 pages.
JP Office Action in Japanese Application No. 2019-531682, dated Oct. 26, 2020, 6 pages (with English translation).

* cited by examiner

TRANSFORMING SOURCE DOMAIN IMAGES INTO TARGET DOMAIN IMAGES

CROSS-REFERENCE TO RELATED APPLICATION

This application is a continuation of and claims priority to PCT Application No. PCT/GR2016/000067, filed on Dec. 15, 2016, the disclosure of which is hereby incorporated by reference in its entirety

BACKGROUND

This specification relates to processing image data through the layers of neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, this specification describes domain transformation neural networks that are implemented by one or more computers and that receive an image from a source domain and a noise vector and process the image from the source domain and the noise vector to transform the image into an image from a target domain.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

There is described herein a system comprising a domain transformation neural network implemented by one or more computers, wherein the domain transformation neural network is configured to: receive an input image from a source domain; receive a noise vector; and process a network input comprising the input image from the source domain and the noise vector to generate a transformed image that is a transformation of the input image from the source domain to a target domain that is different from the source domain.

The noise vector may comprise a predetermined number of noise values. The noise vector may be a vector comprising a predetermined number of noise values. Each noise value is sampled from a respective uniform distribution. The input image may comprise a plurality of channels each having a particular resolution, and the domain transformation neural network may comprise: a combining sub-neural network that is configured to: process the noise vector to generate an additional channel that has the particular resolution; and concatenate the input image and the additional channel to generate a combined input. The domain transformation neural network may further comprise: a convolutional sub-neural network that is configured to: process the combined input to generate the transformed image. Processing the combined input to generate the transformed image may comprise applying a plurality of resolution-preserving convolutions to the combined input or the network input. The convolutional sub-neural network may comprise a plurality of residual blocks each comprising a respective plurality of resolution-preserving convolutional layers. The target domain may be images of a real-world environment and the source domain is images of a simulation of the real-world environment.

There is also disclosed herein a system comprising a domain transformation neural network implemented by one or more computers, wherein the domain transformation neural network is configured to: receive an input image from a source domain, wherein the source domain is images of a simulation of a real-world environment; and process a network input comprising the input image from the source domain to generate a transformed image that is a transformation of the input image from the source domain to a target domain, wherein the target domain is images of the real-world environment.

The domain transformation neural network may be further configured to: receive a noise vector, and the network input may further comprise the noise vector. The noise vector is a vector may comprise a predetermined number of noise values. Each noise value may be sampled from a respective uniform distribution. The input image may comprise a plurality of channels each having a particular resolution, and the domain transformation neural network may comprise: a combining sub-neural network that is configured to: process the noise vector to generate an additional channel that has the particular resolution; and concatenate the input image and the additional channel to generate a combined input. The domain transformation neural network may comprise: a convolutional sub-neural network that is configured to: process either the network input or the combined input to generate the transformed image. Processing the network input or the combined input to generate the transformed image may comprise applying a plurality of resolution-preserving convolutions to the combined input or the network input. The convolutional sub-neural network may comprise a plurality of residual blocks each comprising a respective plurality of resolution-preserving convolutional layers.

There is also disclosed herein a method of training a domain transformation neural network, the method comprising: receiving labeled training source domain images; receiving unlabeled training target domain images; and training, on the labeled training source domain images and the unlabeled training target domain images, the domain transformation neural network to generate transformed images while training a discriminator neural network to distinguish between target domain images and transformed images generated by the domain transformation neural network.

The training may comprise: repeatedly performing a two-step optimization process by alternating between performing a first optimization step and a second optimization step, comprising: during the first optimization step, updating current values of parameters of the discriminator neural network and current values of parameters of a task neural network while holding values of parameters of the domain transformation neural network fixed, wherein the task neural network is configured to receive an input image and to process the input image to generate a task output that characterizes the input image; and during the second optimization step, updating current values of the parameters of the domain transformation neural network while holding values of the parameters of the discriminator neural network and values of the parameters of the task neural network fixed. Updating current values of parameters of the discriminator neural network and current values of parameters of a task neural network while holding values of parameters of the domain transformation neural network fixed may comprise: determining an update for the current values of the parameters of the discriminator neural network by performing a neural network training technique to maximize a domain loss term of a loss function with respect to the parameters of the discriminator neural network, wherein the domain loss term (i) penalizes the discriminator neural network for incorrectly identifying target domain images as not being from the target domain and for identifying transformed images as being from the target domain while (ii) penalizing the domain transformation neural network for generating transformed images that are identified as not being from the target domain by the discriminator neural network; and determining an update for the current values of the parameters of the task neural network by performing the neural network training technique to minimize task-specific loss term of the loss function with respect to the parameters of the task neural network, wherein the task-specific loss term penalizes (i) the task neural network for characterizing transformed images differently from the known task output for the corresponding source domain images while (ii) penalizing the domain transformation neural network for generating transformed images that are characterized differently by the task neural network from the known task output for the corresponding source domain images. Updating current values of the parameters of the domain transformation neural network while holding values of the parameters of the discriminator neural network and values of the parameters of the task neural network fixed may comprise: determining an update for the current values of the parameters of the domain transformation neural network by performing the neural network training technique to minimize the loss function with respect to the parameters of the domain transformation neural network.

Particular embodiments of the subject matter described in this specification can be implemented so as to realize one or more of the following advantages. The neural network system as described in this specification can effectively adapt source domain images to appear as if drawn from a target domain. In particular, in cases where a large number of labeled examples are available from the source domain while a relatively much smaller number of labeled examples are available from the target domain, the neural network system can effectively leverage the large number of labeled examples to learn a transformation in the pixel space from the source domain to the target domain, allowing a data set of labeled target domain images to be effectively generated. The neural network system can be re-used for different tasks without needing to re-train the domain transformation neural network. That is, because the domain transformation neural network maps one image to another at the pixel level, the images generated by the domain transformation neural network are not necessarily specific to the label space used for any one classification task. For example, a domain transformation neural network trained using a first classifier neural network can generate images for training another classifier that uses a different label space in the same adaptation scenario. By incorporating a task-specific loss during the training of the domain transformation neural network, the training process is stabilized and results in a better-performing domain transformation neural network, a better-performing task classifier trained on transformed images generated by the domain transformation neural network, or both. A domain transformation neural network trained using the task-specific loss can nonetheless effectively be used to generate images to be processed by a classifier using a different label space during test time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
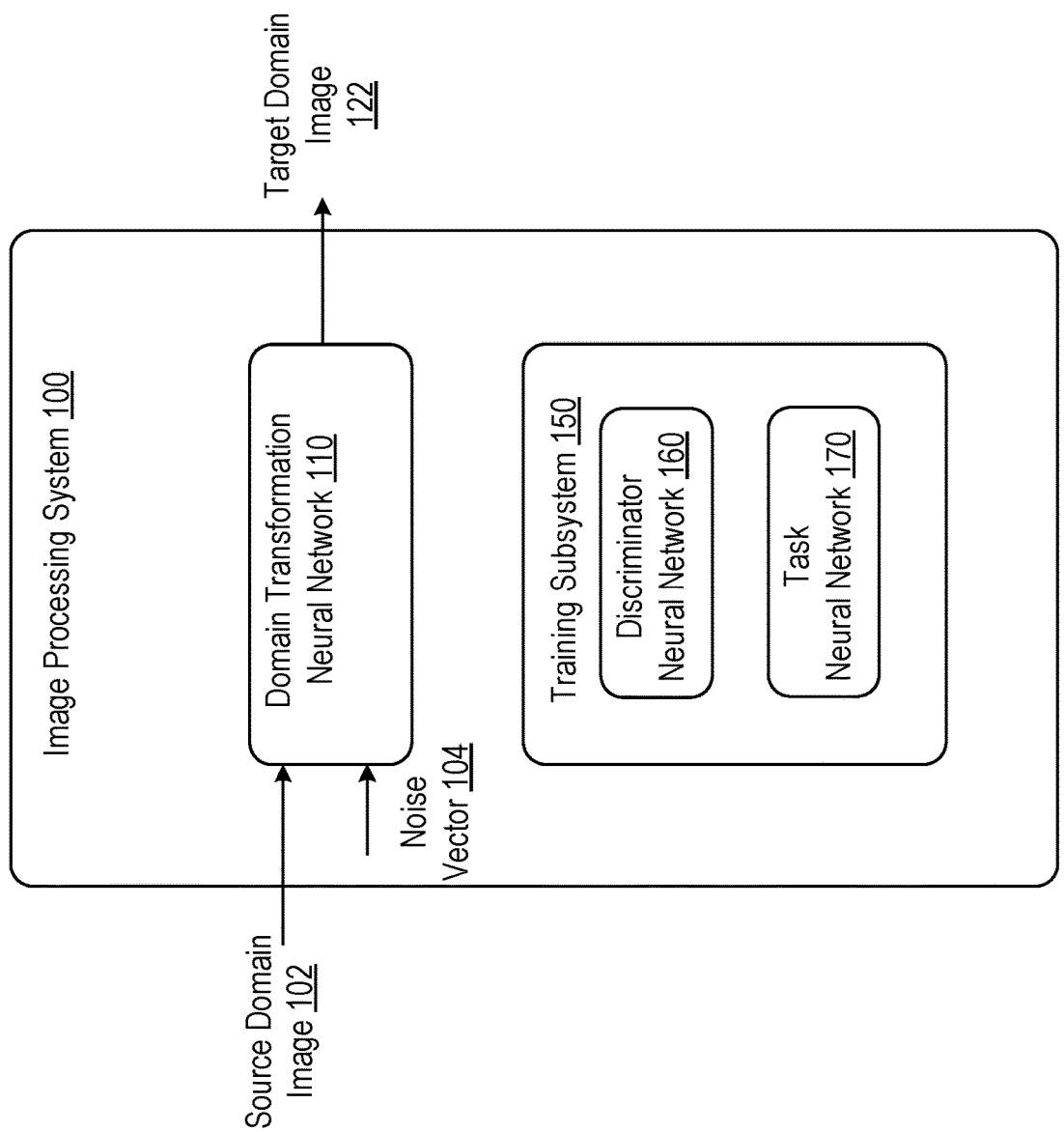
FIG. 1 shows an example image processing neural network system.

FIG. 1 shows an example image processing neural network system 100. The image processing neural network system 100 is an example of a system implemented as computer programs on one or more computers in one or more locations, in which the systems, components, and techniques described below can be implemented.

The image processing neural network system 100 receives as input a source domain image 102 and processes the source domain image 102 to transform the source domain image 102 into a target domain image 122.

The target domain image 122 is an image that represents how the scene depicted in the source domain image 102 would be represented in the target domain. In other words, the target domain image 122 is a transformation of the source domain image 102 into the target domain, i.e., the target domain image 122 appears as if it was sampled from the target domain while maintaining the original content of the source domain image 102.

Generally, the source domain is different from the target domain. In particular, the distribution of pixel values in images from the source domain is different from the distribution of pixel values in images from the target domain.

In some cases, the source and target domains differ primarily in terms of the distribution of low-level image statistics rather than high-level image statistics. Examples of low-level differences in the distributions include those arising due to noise, resolution, illumination and color. High-level differences, on the other hand, may include differences that relate to the number of classes, the types of objects, and geometric variations, such as 3D position.

In one example, the source domain may be images of a virtual environment that simulates a real-world environment and the target domain may be images of the real-world environment. For example, the source domain images may be images of a virtual environment that simulates a real-world environment that is to be interacted with by a robot or other mechanical agent or by an autonomous or semi-autonomous vehicle, while the target domain images may be images of the real-world environment as captured by the mechanical agent or the vehicle. Thus, the source domain images may be more expansive, in particular for edge cases that are occur rarely or are difficult or dangerous to generate in the real-world environment. By transforming source domain images into target domain images while developing a control policy for the agent or vehicle or while training a neural network that is used to select actions to be performed by the agent or vehicle, the performance of the agent or vehicle in the real-world environment may be improved, even if certain situations are only encountered in the simulated version of the environment.

In another example, the source and target domains may both be real-world images, but with photometric differences, e.g., one domain may be indoor images and the other domain may be outdoor images of similar objects.

In another example, the source and target domains may be images selected from different collections of images of similar objects. For example, the source domain may be images from a curated image collection and the target domain may be images from a non-curated data set, e.g., Internet images.

In some cases, the source domain may be a domain in which labeled images are easily available, while obtaining labeled image data for the target domain is computationally expensive or otherwise difficult or infeasible.

The image processing neural network system 100 includes a domain transformation neural network 110 that has been configured through training to receive the source domain image 102 and, optionally, a noise vector 104 and to process the source domain image 102 and, when configured to receive a noise vector, the noise vector 104 to generate the target domain image 122.

Generally, in implementations that use a noise vector, the noise vector 104 is a vector that includes a predetermined number of noise values, with the noise values in the noise vector for one input image likely being different from the noise values in the noise vector for another input image. In particular, the image processing neural network system 100 generates each of the noise values, e.g., by sampling each value from a respective uniform distribution.

The domain transformation neural network 110 will be described in more detail below with reference to FIGS. 2 and 3.

The image processing system 100 also includes a training subsystem 150 that trains the domain transformation neural network 110 to determine trained values of the parameters of the domain transformation neural network 110. In particular, the training subsystem 150 trains the domain transformation neural network 110 using a discriminator neural network 160 and a task neural network 170.

The discriminator neural network 160 is a neural network that is configured to receive an input image, i.e., an image from the source domain, an image from the target domain, or an image generated by the domain transformation neural network 110, and to process the input image to generate a target domain score that represents a likelihood that the target image was sampled from the target domain.

The task neural network 170 is a neural network that receives an image, i.e., an image from the source domain, an image from the target domain, or an image generated by the domain transformation neural network 110, and processes the input image to perform an image processing task on the received image to generate a task output for the image.

For example, the task neural network 170 can be configured to classify input images from the target domain as including images of objects from one or more object categories, i.e., to generate a classification output for an input image that includes a respective score for each of the one or more object categories that represents a likelihood that the input image includes an image of an object that belongs to the object category.

As another example, the task neural network 170 can be configured to estimate the pose of objects in input images. Generally, the pose of an object is a combination of the position and orientation of the object in the input image. For example, the system can generate a pose vector that includes an estimated location in the image of each of a predetermined number of body joints of the object.

As another example, the task neural network 170 can be configured to divide input images into multiple regions, each of which belongs to a different one of a set of categories. For example, the system can generate, as the task output, data, e.g., a vector or a matrix, that identifies for each pixel of the input image the category to which the pixel belongs.

Training the domain transformation neural network 110 using the discriminator neural network 160 and the task neural network 170 is described below with reference to FIGS. 4 and 5.

Figure 2:
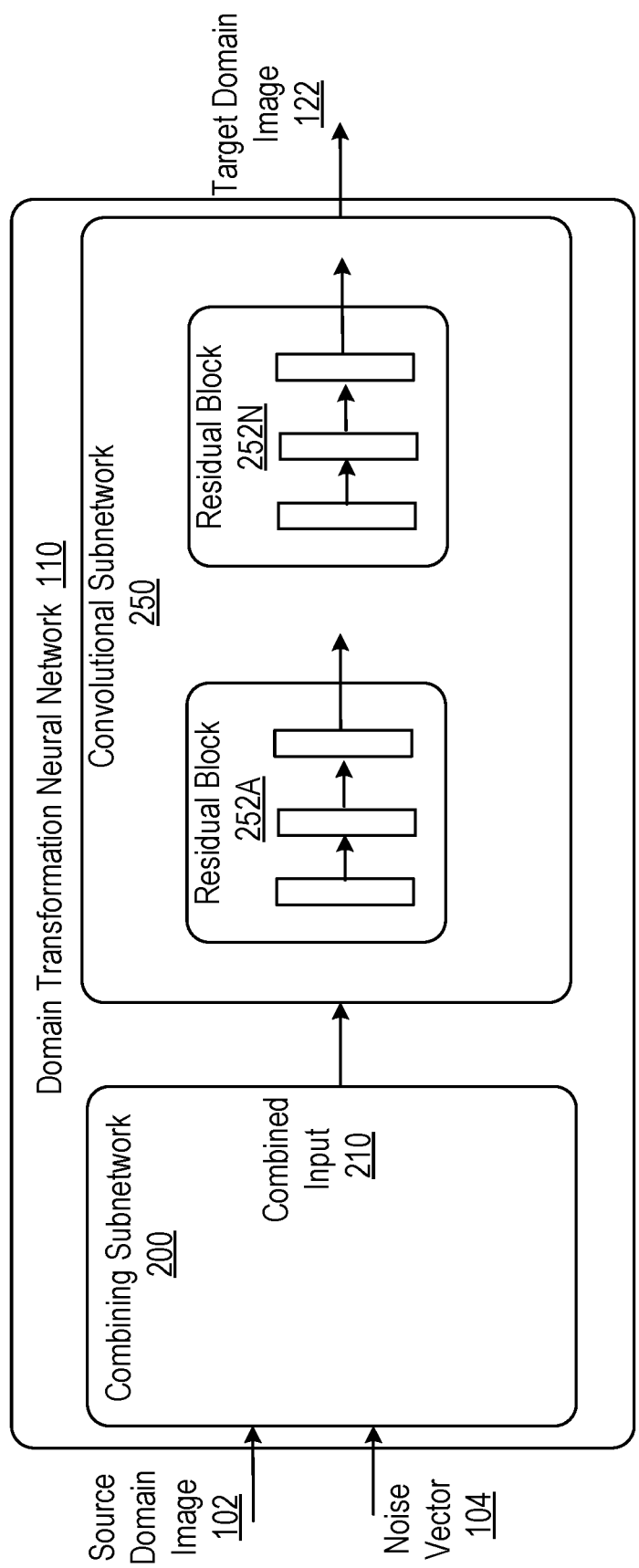
FIG. 2 shows an example architecture of a domain transformation neural network.

FIG. 2 shows an example architecture for the domain transformation neural network 110. In particular, in the example of FIG. 2, the domain transformation neural network 110 is configured to receive a source domain image and a noise vector and includes a combining sub-neural network 200 and a convolutional sub-neural network 250.

The combining sub-neural network 200 is configured to receive the source domain image 102 and the noise vector 104 and to process the source domain image 102 and the noise vector 104 to generate a combined input 210. The convolutional sub-neural network 250 is configured to process the combined input 210 to generate the target domain image 122.

In particular, the source domain image 102 has multiple channels each having a particular resolution. For example, the source domain image 102 may be an RGB image having a red color channel, a green color channel, and a blue color channel, with each channel having the same resolution.

The combining sub-neural network 200 is configured to process the noise vector 104 to generate an additional channel that has the particular resolution, e.g., by processing the noise vector 104 through one or more fully-connected layers that transform the dimensionality of the noise vector.

The combining sub-neural network 200 is then configured to concatenate the source domain image 102 and the additional channel to generate the combined input 210, i.e., by processing the source domain image 102 and the additional channel through a depth concatenation layer.

Generally, the convolutional sub-neural network 250 is configured to process the combined input 210 to generate the target domain image 122 by applying resolution-preserving convolutions to the combined input 210, i.e., by processing the combined input 210 through neural network layers that include multiple resolution-preserving convolutional layers. A resolution-preserving convolutional layer is a neural network layer that receives an input having one or more channels that each have the same particular resolution and generates an output that also has the particular resolution. That is, a resolution-preserving convolutional layer may generate an output that has a different number of channels from the input but each output channel will have the same resolution as the input channels.

In particular, the convolutional sub-neural network 250 includes multiple residual blocks 252A-252N that each include multiple resolution-preserving convolutional layers and one or more other kinds of neural network layers, e.g., batch normalization layers.

In some examples, each residual block 252A-252N has the following architecture: a first resolution-preserving convolutional layer followed by a batch normalization layer, followed by an activation layer that applies a rectified linear unit activation to the output of the batch normalization layer, followed by another resolution-preserving convolutional layer, followed by another batch normalization layer, and, finally, followed by a combining layer that combines, e.g., sums or averages, the output of the last batch normalization layer with the input to the residual block to generate the output of the residual block.

In some cases, the convolutional sub-neural network 250 also includes one or more initial resolution-preserving convolutional layers before the first residual block in the convolutional sub-neural network 250, one or more final resolution-preserving convolutional layers after the last residual block in the convolutional sub-neural network 250, or both. For example, the final resolution-preserving convolutional layers can each be layers that have three channels and stride 1 and then apply an element-wise activation function, e.g., inverse tangent, sigmoid, or another activation function that maps inputs to an appropriate output range, with the last final resolution-preserving convolutional layer generating the target domain image 122.

In implementations where a noise vector is not used, the input source domain image can be passed directly to the convolutional sub-neural network 250, i.e., the neural network 110 does not include a combining sub-neural network 200.

Figure 3:
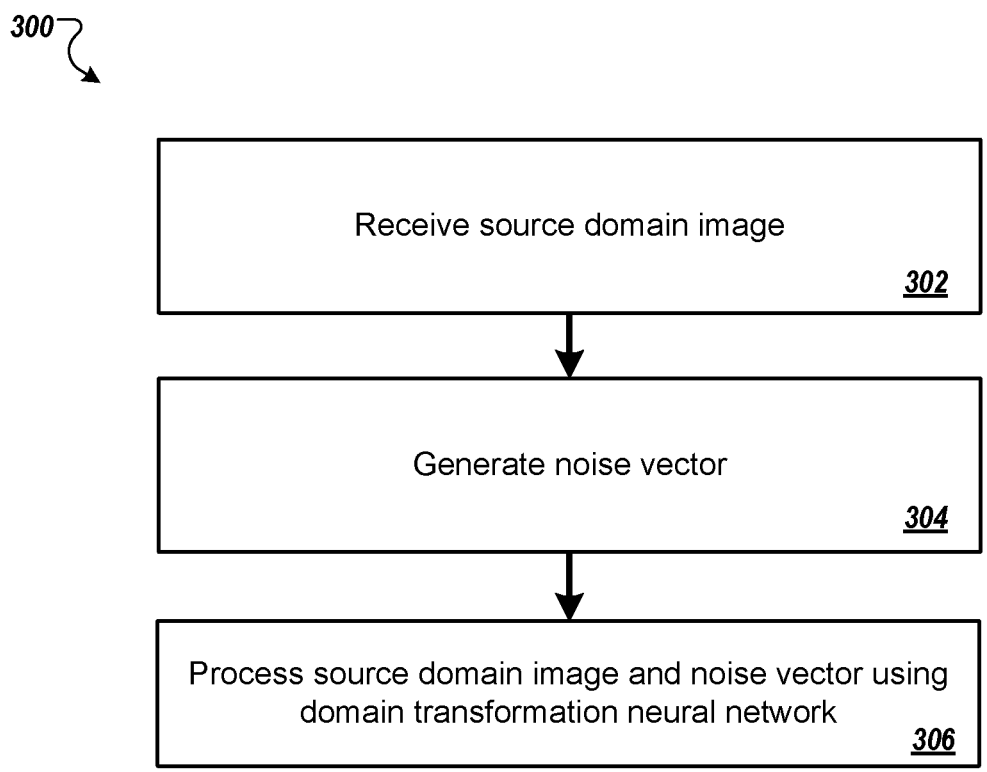
FIG. 3 is a flow diagram of an example process for generating a target domain image from a source domain image.

FIG. 3 is a flow diagram of an example process 300 for generating a target domain image from a source domain image. For convenience, the process 300 will be described as being performed by a system of one or more computers located in one or more locations. For example, an image processing neural network system, e.g., the image processing neural network system 100 of FIG. 1, appropriately programmed, can perform the process 300.

The system receives an image from the source domain (step 302).

Optionally, the system generates a noise vector (step 304). As described above, the system can generate the elements of the noise vector by sampling values from one or more uniform distributions.

The system processes the source domain image and, when used, the noise vector using a domain transformation neural network (step 304). As described above, the domain transformation neural network has been configured through training to receive the source domain image and, when used, the noise vector and to process the source domain image to generate a target domain image, i.e., to transform the source domain image into an image from the target domain.

Once generated, the system can use the target domain image for any of a variety of purposes.

For example, if the source domain image is labeled, the system can label the target domain image with the label for the source domain image and store the labeled target domain image for use as training data to train a classifier neural network to classify target domain images or a different kind of image processing neural network to perform a different image processing task.

As another example, the system can use the target domain image as part of a reinforcement learning technique to learn a control policy for a robot or another agent. That is, the system can use the domain transformation neural network to transform images generated as a result of the interaction of a simulated version of the agent with a simulated environment into images of a real-world environment and use the images of the real-world environment in place of the images of the simulated environment in learning the control policy.

Figure 4:
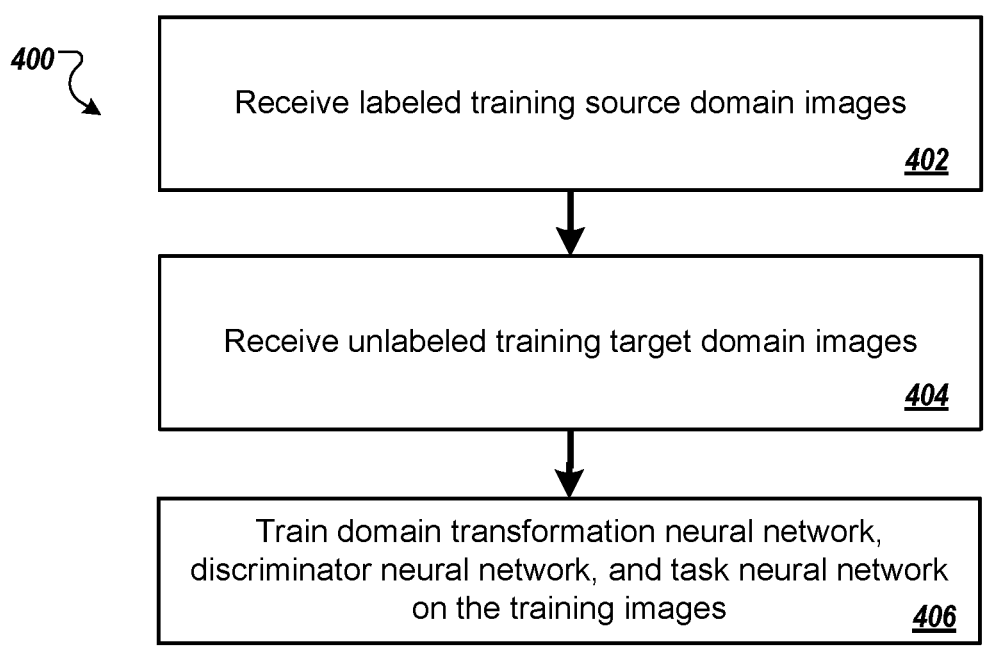
FIG. 4 is a flow diagram of an example process for training a domain transformation neural network.

FIG. 4 is a flow diagram of an example process 400 for training a domain transformation neural network. For convenience, the process 400 will be described as being performed by a system of one or more computers located in one or more locations. For example, an image processing neural network system, e.g., the image processing neural network system 100 of FIG. 1, appropriately programmed, can perform the process 400.

The system receives labeled training source domain images (step 402). A labeled image is an image for which a known task output, i.e., the task output that should be generated by the task neural network for the image, is available to the system during training.

The system receives unlabeled training target domain images (step 404). An unlabeled image is an image for which no known task output is available to the system during training.

The system trains the domain transformation neural network, the discriminator neural network, and the task neural network on the labeled training source domain images and the unlabeled target domain images (step 406).

During the training, the system trains the domain transformation neural network to generate transformed images that are correctly characterized by the task neural network, i.e., are assigned the same task output as their corresponding source domain image, and that are assigned target domain scores by the discriminator neural network that indicate that the transformed images are likely to be from the target domain. However, the system also trains the discriminator neural network to attempt to distinguish the transformed images from actual target domain images, i.e., to generate high target domain scores for actual target domain images while generating lower target domain scores for transformed images.

In particular, the system trains the neural networks by repeatedly performing a two-step optimization process using the training images. During one step of the optimization process, the system updates the parameters of the discriminator neural network and the task neural network while holding the domain transformation neural network parameters fixed. During the other step of the optimization process, the system updates the parameters of the domain transformation neural network while holding the parameters of the discriminator neural network and the task neural network fixed. During the training, the system alternates between the two steps of the optimization process, e.g., after every k batches of labeled and unlabeled training images, where k is a constant value greater than or equal to one.

The two-step optimization process is described in more detail below with reference to FIG. 5.

Figure 5:
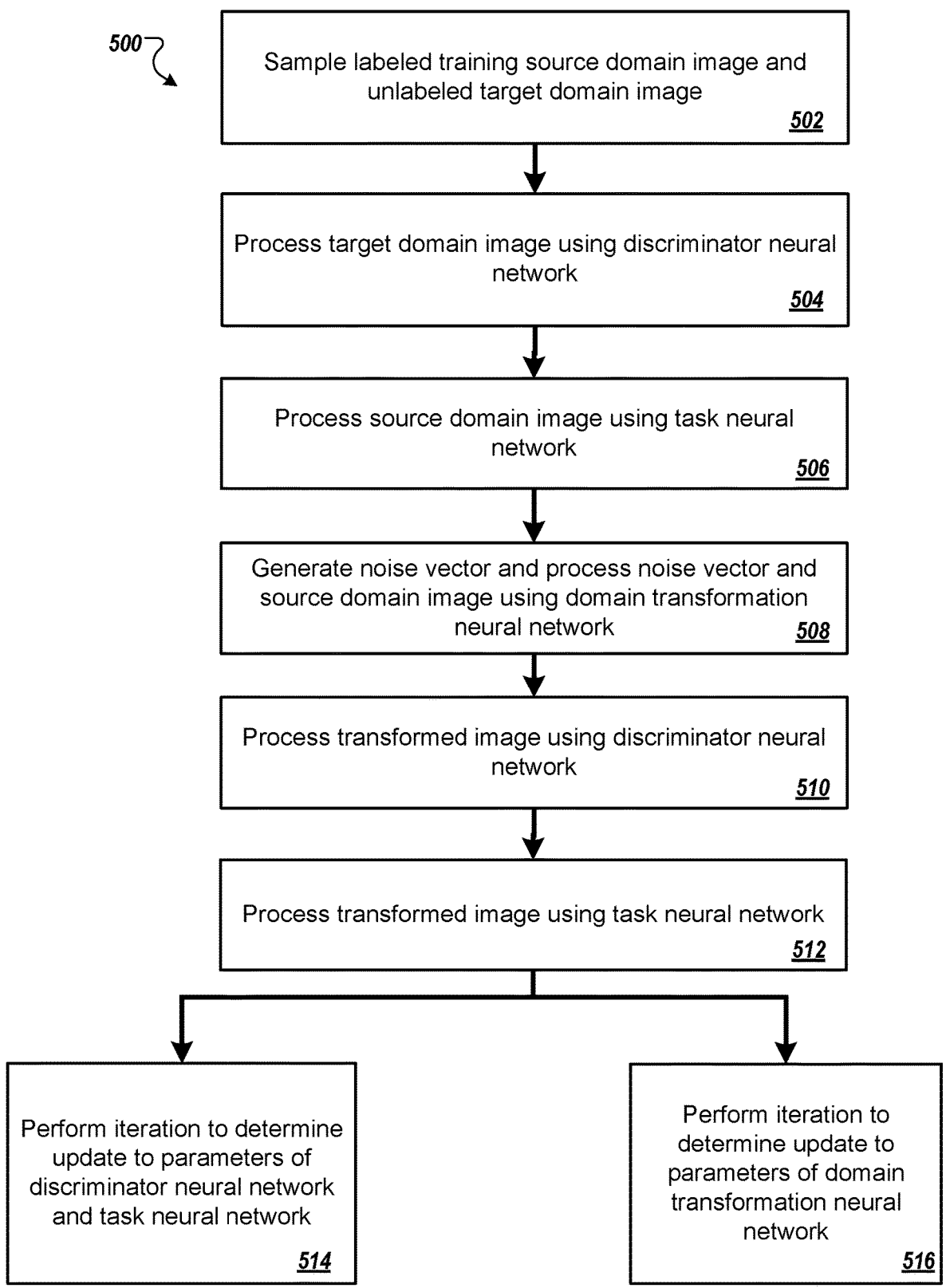
FIG. 5 is a flow diagram of an example process for performing an optimization step during the training of a domain transformation neural network.

FIG. 5 is a flow diagram of an example process 500 for performing an optimization step during the training a domain transformation neural network. For convenience, the process 500 will be described as being performed by a system of one or more computers located in one or more locations. For example, an image processing neural network system, e.g., the image processing neural network system 100 of FIG. 1, appropriately programmed, can perform the process 500.

The system samples a labeled source domain image and an unlabeled training target domain image from the training images (step 502).

The system processes the target domain image using the discriminator neural network in accordance with current values of the parameters of the discriminator neural network to generate a target domain score for the target domain image (504).

The system processes the source domain image using the task neural network in accordance with current values of the parameters of the task neural network to generate a task output for the source domain image (506).

Optionally, the system generates a noise vector and processes the source domain image and, if used, the generated noise vector using the domain transformation neural network in accordance with current values of the parameters of the domain transformation neural network to generate a transformed image (508).

The system processes the transformed image using the discriminator neural network in accordance with current values of the parameters of the discriminator neural network to generate a target domain score for the transformed image (510).

The system processes the transformed image using the task neural network in accordance with current values of the parameters of the task neural network to generate a task output for the transformed image (512).

If the current optimization step is to update the parameters of the task neural network and the discriminator neural network, the system performs an iteration of a neural network training technique to determine an update for the parameters of the task neural network and the discriminator neural network while keeping the current values of the parameters of the domain transformation neural network fixed (514).

In particular, the system performs an iteration of the neural network training technique to maximize a domain loss term of a loss function with respect to the parameters of the discriminator neural network and minimize a task-specific loss term of the loss function with respect to the parameters of the task neural network.

In some implementations, the loss function satisfies:

$$\alpha L_d(D,G) + \beta L_t(G,T),$$

where $\alpha$ and $\beta$ are fixed weights that control the interaction of the losses, $L_d(D,G)$ is the domain loss that measures how accurately the discriminator neural network can identify the domain of target domain images and transformed images, and $L_t(G,T)$ is the task-specific loss that measures the performance of the task neural network on the classification task that the task neural network is configured to perform.

In particular, the domain loss (i) penalizes the discriminator neural network for incorrectly identifying target domain images as having low likelihoods of being from the target domain and for identifying transformed images as having high likelihoods of being from the target domain while (ii) penalizing the domain transformation neural network for generating transformed images that are identified as having low likelihoods of being from the target domain by the discriminator neural network. In some implementations, the domain loss $L_d(D,G)$ satisfies:

$$L_d(D,G) = E_{x^t}[\log(D(x^t;\theta_D))] + E_{x^s,z}[\log(1 - D(G(x^s,z;\theta_G);\theta_D))],$$

where $E_y$ is the expectation with respect to a variable y, $D(x^t; \theta_D)$ is the target domain score generated for the target domain image $x^t$ in accordance with the current values of the discriminator neural network parameters $\theta_D$, $G(x^s, z; \theta_G)$ is the transformed image generated from the source domain image $x^s$ and the noise vector z in accordance with the current values of the discriminator neural network parameters $\theta_G$, and $D(G(x^s, z; \theta_G); \theta_D)$ is the target domain score generated for the transformed image.

The task-specific loss penalizes (i) the task neural network for characterizing transformed images differently from the label assigned to the corresponding source domain images while (ii) penalizing the domain transformation neural network for generating transformed images that are characterized differently by the task neural network from the known task output for the corresponding source domain images. In some implementations, the task-specific loss also directly penalizes the task neural network for incorrectly characterizing source domain images. In some of these implementations, the task-specific loss $L_t(G,T)$ satisfies:

$$L_t(G,T) = E_{x^s,y^s,z}[-y^{s^T}\log(T(x^s;\theta_T)) - y^{s^T}\log(T((G(x^s,z;\theta_G);\theta_T))],$$

where $y^{s^T}$ is the transpose of the task output for the source domain image $x^s$, $T(x^s; \theta_T)$ is the task output generated for the source domain image $x^s$ in accordance with the current values of the task neural network parameters $\theta_T$, and $T(G(x^s, z; \theta_G); \theta_T)$ is the task output generated for the transformed image generated from the source domain image $x^s$.

In some implementations, during the training process, the system may impose certain constraints on how the transformed images should differ from their corresponding source domain images by adding one or more additional terms to the loss function.

For example, in some cases, an additional similarity loss term having a corresponding fixed weight can be added to the loss function that penalizes the domain transformation neural network for generating transformed images that have large differences in their foreground pixels from their corresponding source domain images.

As another example, an additional perceptual loss term having a corresponding fixed weight can be added to the loss function that penalizes the domain transformation neural network for generating transformed images that have different high-level image feature representations from their corresponding source domain images.

As another example, an additional regularization loss term, e.g., an L2 regularization loss term, having a corresponding fixed weight can be added to the loss function that regularizes the training of the domain transformation neural network.

To perform the iteration of the neural network training technique to determine an update for the parameters of the task neural network and the discriminator neural network while keeping the current values of the parameters of the domain transformation neural network fixed, the system determines an update to the parameters of the discriminator neural network by performing an iteration of a conventional gradient ascent-based technique to maximize the domain loss and determines an update to the parameters of the task neural network by performing an iteration of a conventional gradient descent-based technique to minimize the task-specific loss term.

If the current optimization step is to update the parameters of the domain transformation neural network, the system performs an iteration of the neural network training technique to determine an update for the parameters of the domain transformation neural network while keeping the current values of the parameters of the task neural network and the discriminator neural network fixed (516). In particular, the system performs an iteration of the conventional gradient descent-based technique to minimize the loss function, i.e., the combination of the domain loss, the task-specific loss and, if included, any additional terms, with respect to the parameters of the domain transformation neural network.

Once the process 500 has been performed for an entire batch of training examples, the system applies the determined updates to the current values of the corresponding neural network to update the current values of the corresponding neural networks.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   a domain transformation neural network implemented by one or more computers, wherein the domain transformation neural network is configured to:
   receive an input image from a source domain; and
   process a network input comprising the input image from the source domain to generate a transformed image that is a transformation of the input image from the source domain to a target domain that is different from the source domain,
   wherein the domain transformation neural network has been trained concurrently with a discriminator neural network that is configured to distinguish between target domain images and transformed images generated by the domain transformation neural network, and
   wherein the training comprises repeatedly performing a two-step optimization process by alternating between performing a first optimization step and a second optimization step, comprising:
   during the first optimization step, updating current values of parameters of the discriminator neural network and current values of parameters of a task neural network while holding values of parameters of the domain transformation neural network fixed, wherein the task neural network is configured to
   receive an input image and to process the input image to generated a task output that characterizes the input image; and
   during the second optimization step, updating current values of the parameters of the domain transformation neural network while holding values of the parameters of the discriminator neural network and values of the parameters of the task neural network fixed.

2. The system of claim 1, wherein the network input further comprises a noise vector and the noise vector is a vector comprising a predetermined number of noise values.

3. The system of claim 2, wherein each noise value is sampled from a respective uniform distribution.

4. The system of claim 1, wherein:
   the input image has a particular resolution;
   the domain transformation neural network comprises:
   a combining sub-neural network that is configured to:
   process the noise vector to generate an additional channel that has teh particular resolution, and
   concatenate the input image and the additional channel to generate a combined input, and
   a convolutional sub-neural network that is configured to process the combined input to generate that transformed image, wherein processing the combined input to generate the transformed image comprises applying a plurality of resolution preserving convolutions to the combined input or the network input; and
   the convolutional sub-neural network comprises a plurality of residual blocks each comprising a respective plurality of resolution-preserving convolutional layers.

5. A method of training a domain transformation neural network that is configured to receive an input image from a source domain and process a network input comprising the input image from the source domain to generate a transformed image that is a transformation of the input image from the source domain to a target domain that is different from the source domain, the method comprising:
   receiving labeled training source domain images;
   receiving unlabeled training target domain images; and
   training, on the labeled training source domain images and the unlabeled training target domain images, the domain transformation neural network to generate transformed images while training a discriminator neural network to distinguish between target domain images and transformed images generated by the domain transformation neural network,
   wherein the training comprises repeatedly performing a two-step optimization process by alternating between performing a first optimization step and a second optimization step, comprising:
   during the first optimization step, updating current values of parameters of the discriminator neural network and current values of parameters of a task neural network while holding values of parameters of the domain transformation neural network fixed, wherein the task neural network is configured to receive an input image and to process the input image to generate a task output that characterizes the input image; and
   during the second optimization step, updating current values of the parameters of the domain transformation neural network while holding values of the parameters of the discriminator neural network and values of the parameters of the task neural network fixed.

6. The method of claim 5, wherein updating current values of parameters of the discriminator neural network and current values of parameters of a task neural network while holding values of parameters of the domain transformation neural network fixed comprises:

determining an update for the current values of the parameters of the discriminator neural network by performing a neural network training technique to maximize a domain loss term of a loss function with respect to the parameters of the discriminator neural network, wherein the domain loss term (i) penalizes the discriminator neural network for incorrectly identifying target domain images as not being from the target domain and for identifying transformed images as being from the target domain while (ii) penalizing the domain transformation neural network for generating transformed images that are identified as not being from the target domain by the discriminator neural network; and determining an update for the current values of the parameters of the task neural network by performing the neural network training technique to minimize task-specific loss term of the loss function with respect to the parameters of the task neural network, wherein the task-specific loss term penalizes (i) the task neural network for characterizing transformed images differently from the known task output for the corresponding source domain images while (ii) penalizing the domain transformation neural network for generating transformed images that are characterized differently by the task neural network from the known task output for the corresponding source domain images.

7. The method of claim 6, wherein updating current values of the parameters of the domain transformation neural network while holding values of the parameters of the discriminator neural network and values of the parameters of the task neural network fixed comprises:

determining an update for the current values of the parameters of the domain transformation neural network by performing the neural network training technique to minimize the loss function with respect to the parameters of the domain transformation neural network.

8. A method comprising:

receiving an input image from a source domain; and processing a network input comprising the input image from the source domain using a domain transformation neural network to generate a transformed image that is a transformation of the input image from the source domain to a target domain that is different from the source domain, wherein the domain transformation neural network has been trained concurrently with a discriminator neural network that is configured to distinguish between target domain images and transformed images generated by the domain transformation neural network, and wherein the training comprises repeatedly performing a two-step optimization process by alternating between performing a first optimization step and a second optmization step, comprising:

during the first optimization step, updating current values of parameters of the discriminator neural network and current values of parameters of a task neural network while holding values of parameters of the domain transformation neural network fixed, wherein the task neural network is configured to receive an input image and to process the input image to generate a task output that characterizes the input image; and during the second optimization step, updating current values of the parameters of the domain transformation neural network while holding values of the parameters of the discriminator neural network and values of the parameters of the task neural network fixed.

9. The method of claim 8, wherein:

the input image has a particular resolution;

the domain transformation neural network comprises;

a combining sub-neural network that is configured to:

process the noise vector to generate an additional channel that has the particular resolution; and concatenate the input image and the additional channel to generate a combined input; and a convolutional sub-neural network that is configured to process the combined input to generate the transformed image, wherein processing the combined input to generate the transformed image comprises applying a plurality of resolution-preserving convolutions to the combined input or the network input, and the convolutional sub-neural network comprises a plurality of residual blocks each comprising a respective plurality of resolution-preserving convolutional layers.

10. The method of claim 8, wherein the network input further comprises noise vector and the noise vector is a vector comprising a predetermined number of noise values.

11. The method of claim 10, wherein each noise value is sampled from a respective uniform distribution.

12. One or more non-transitory storage media storing instructions that when executed by one or more computers cause the one or more computers to perform operations comprising:

receiving an input image from a source domain; and processing a network input comprising the input image from the source domain using a domain transformation neural network to generate a transformed image that is a transformation of the input image from the source domain to a target domain that is different from the source domain, wherein the domain transformation neural network has been trained concurrently with a discriminator neural network that is configured to distinguish between target domain images and transformed images generated by the domain transformation neural network, and wherein the training comprises repeatedly performing a two-step optimization process by alternating between performing a first optimization step and a second optimization step, comprising:

during the first optimization step, updating current values of parameters of the discriminator neural network and current values of parameters of task neural network while holding values of parameters of the domain transformation neurl network fixed, wherein the task neural network is configured to receive an input image and to process the input image to generate a task output that characterizes the input image; and during the second optimization step, updating current values of the parameters of the domain transformation neural network while holding values of the parameters of the discriminator neural network and values of the parameters of the task neural network fixed.

13. The non-transitory storage media of claim 12, wherein:
the input image has a particular resolution;
the domain transformation neural network comprises;
a combining sub-neural network that is configured to:
process the noise vector to generate an additional channel that has the particular resolution, and concatenate the input image and the additional channel to generate a combined input, and
a convolutional sub-neural network is configured to process the combined input to generate that tranformed image, wherein processing the combined input to generate the transformed image comprises applying a plurality of resolution-preserving convolutions to the combined input or the network input; and
the convolutional sub-neural network comprises a plurality of residual blocks each comprising a respective plurality of resolution-preserving convolutional layers.

14. The non-transitory storage media of claim 12, wherein the network input further comprises a noise vector and the noise vector is a vector comprising a predetermined number of noise values.

15. A system comprising one or more computers and one or more storage devices storing instructions that when executed by the one or more computers cause the one or more computers to perform operations for training a domain transformation neural network, wherein the domain transformation neural network is configured to receive an input image from a source domain and process a network input comprising the input image from the source domain to generate a transformed image that is a transformation of the input image from the source domain to a target domain that is different from the source domain, the operations comprising:
receiving labeled training source domain images;
receiving unlabeled training target domain images; and
training, on the labeled training source domain images and the unlabeled training target domain images, the domain transformation neural network to generate transformed images while training a discriminator neural network to distinguish between target domain images and transformed images generated by the domain transformation neural network,
wherein the training comprises repeatedly performing a two-step optimization process by alternating between performing a first optimization step and a second optimization step, comprising:
during the first optimization step, updating current values of parameters of the discriminator neural network and current values of parameters of a task neural network while holding values of parameters of the domain transformation neural network fixed, wherein the task neural network is configured to receive an input image and to process the input image to generate a task output that characterizes the input image; and
during the second optimization step, updating current values of the parameters of the domain transformation neural network while holding values of the parameters of the discriminator neural network and values of the parameters of the task neural network fixed.

16. The system of claim 15, wherein updating current values of parameters of the discriminator neural network and current values of parameters of a task neural network while holding values of parameters of the domain transformation neural network fixed comprises:
determining an update for the current values of the parameters of the discriminator neural network by performing a neural network training technique to maximize a domain loss term of a loss function with respect to the parameters of the discriminator neural network, wherein the domain loss term (i) penalizes the discriminator neural network for incorrectly identifying target domain images as not being from the target domain and for identifying transformed images as being from the target domain while (ii) penalizing the domain transformation neural network for generating transformed images that are identified as not being from the target domain by the discriminator neural network; and
determining an update for the current values of the parameters of the task neural network by performing the neural network training technique to minimize task-specific loss term of the loss function with respect to the parameters of the task neural network, wherein the task-specific loss term penalizes (i) the task neural network for characterizing transformed images differently from the known task output for the corresponding source domain images while (ii) penalizing the domain transformation neural network for generating transformed images that are characterized differently by the task neural network from the known task output for the corresponding source domain images.

17. The system of claim 16, wherein updating current values of the parameters of the domain transformation neural network while holding values of the parameters of the discriminator neural network and values of the parameters of the task neural network fixed comprises:
determining an update for the current values of the parameters of the domain transformation neural network by performing the neural network training technique to minimize the loss function with respect to the parameters of the domain transformation neural network.

18. One or more non-transitory storage media storing instructions that when executed by one or more computers cause the one or more computers to perform operations for training a domain transformation neural network, wherein the domain transformation neural network is configured to receive an input image from a source domain and process a network input comprising the input image from the source domain to generate a transformed image that is a transformation of the input image from the source domain to a target domain that is different from the source domain, the operations comprising:
receiving labeled training source domain images;
receiving unlabeled training target domain images; and
training, on the labeled training source domain images and the unlabeled training target domain images, the domain transformation neural network to generate transformed images while training a discriminator neural network to distinguish between target domain images and transformed images generated by the domain transformation neural network,
wherein the training comprises repeatedly performing a two-step optimization process by alternating between performing a first optimization step and a second optimization step, comprising:
during the first optimization step, updating current values of parameters of the discriminator neural network and current values of parameters of a task neural network while holding values of parameters of the domain transformation neural network fixed, wherein the task neural network is configured to receive an input image and to process the input image to generate a task output that characterizes the input image; and during the second optimization step, updating current values of the parameters of the domain transformation neural network while holding values of the parameters of the discriminator neural network and values of the parameters of the task neural network fixed.

19. The non-transitory storage media of claim 18, wherein updating current values of parameters of the discriminator neural network and current values of parameters of a task neural network while holding values of parameters of the domain transformation neural network fixed comprises:

determining an update for the current values of the parameters of the discriminator neural network by performing a neural network training technique to maximize a domain loss term of a loss function with respect to the parameters of the discriminator neural network, wherein the domain loss term (i) penalizes the discriminator neural network for incorrectly identifying target domain images as not being from the target domain and for identifying transformed images as being from the target domain while (ii) penalizing the domain transformation neural network for generating transformed images that are identified as not being from the target domain by the discriminator neural network; and determining an update for the current values of the parameters of the task neural network by performing the neural network training technique to minimize task-specific loss term of the loss function with respect to the parameters of the task neural network, wherein the task-specific loss term penalizes (i) the task neural network for characterizing transformed images differently from the known task output for the corresponding source domain images while (ii) penalizing the domain transformation neural network for generating transformed images that are characterized differently by the task neural network from the known task output for the corresponding source domain images.

20. The non-transitory storage media of claim 19, wherein updating current values of the parameters of the domain transformation neural network while holding values of the parameters of the discriminator neural network and values of the parameters of the task neural network fixed comprises:

determining an update for the current values of the parameters of the domain transformation neural network by performing the neural network training technique to minimize the loss function with respect to the parameters of the domain transformation neural network.

* * * * *